(12) United States Patent
Falta et al.

(10) Patent No.: US 8,387,441 B2
(45) Date of Patent: Mar. 5, 2013

(54) INJECTOR FLOW MEASUREMENT FOR FUEL CELL APPLICATIONS

(75) Inventors: Steven R. Falta, Honeoye Falls, NY (US); Steven G. Goebel, Victor, NY (US); Daniel C. Di Fiore, Scottsburg, NY (US); Ralf Senner, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 408 days.

(21) Appl. No.: 12/636,276

(22) Filed: Dec. 11, 2009

(65) Prior Publication Data

US 2011/0138883 A1 Jun. 16, 2011

(51) Int. Cl.
*G01M 3/26* (2006.01)

(52) U.S. Cl. ........... 73/40.5 R; 73/49.7; 73/114.38; 73/114.43; 73/114.48; 73/114.52

(58) Field of Classification Search ......... 73/40, 40.5 R, 73/49.7, 114.38, 114.43, 14.48, 114.52, 861.42, 73/861.43

See application file for complete search history.

(56) References Cited

U.S. PATENT DOCUMENTS

| | | | | |
|---|---|---|---|---|
| 6,156,447 | A * | 12/2000 | Bette et al. | 429/432 |
| 6,918,382 | B2 * | 7/2005 | Ramachandran et al. | 123/527 |
| 7,320,840 | B2 | 1/2008 | Pechtold et al. | |
| 7,393,602 | B2 * | 7/2008 | Thompson et al. | 429/429 |
| 7,771,854 | B2 * | 8/2010 | Kotani et al. | 429/429 |
| 7,797,090 | B2 * | 9/2010 | Zanardelli et al. | 701/31.4 |
| 7,829,233 | B2 * | 11/2010 | Kizaki | 429/443 |
| 7,942,035 | B2 * | 5/2011 | Booden et al. | 73/40.5 R |
| 8,067,127 | B2 * | 11/2011 | Yoshida | 429/444 |
| 8,071,243 | B2 * | 12/2011 | Sugawara et al. | 429/429 |
| 2003/0022044 | A1 * | 1/2003 | Inai et al. | 429/23 |
| 2004/0028964 | A1 * | 2/2004 | Smaling | 429/19 |
| 2006/0174624 | A1 * | 8/2006 | Grabowski et al. | 60/709 |
| 2007/0180769 | A1 * | 8/2007 | Bonadies et al. | 48/198.7 |
| 2007/0207355 | A1 * | 9/2007 | Yoshida | 429/25 |
| 2007/0218330 | A1 * | 9/2007 | Naganuma | 429/25 |
| 2008/0118793 | A1 * | 5/2008 | Chapman et al. | 429/13 |
| 2008/0141760 | A1 * | 6/2008 | Sienkowski et al. | 73/40.5 R |
| 2009/0035614 | A1 * | 2/2009 | Wake et al. | 429/13 |
| 2011/0008699 | A1 * | 1/2011 | Hashimoto et al. | 429/444 |
| 2011/0087441 | A1 * | 4/2011 | Salvador et al. | 702/24 |

FOREIGN PATENT DOCUMENTS

| | | | |
|---|---|---|---|
| DE | 102006059030 A1 * | 6/2008 | |
| EP | 2207232 A1 * | 7/2010 | |
| JP | 2009059570 A * | 3/2009 | |

* cited by examiner

*Primary Examiner* — David Rogers
(74) *Attorney, Agent, or Firm* — John A. Miller; Miller IP Group, PLC

(57) ABSTRACT

A method for determining the amount of fuel flow from a high pressure gas tank to the anode side of a fuel cell stack through pulsed injector. The anode sub-system pressure is measured just before the injector pulse and just after injector pulse and a difference between the pressures is determined. The difference between the pressures, the volume of the anode sub-system, the ideal gas constant, the anode sub-system temperature, the fuel consumed from the reaction in the fuel cell stack during the injection event and the fuel cross-over through membranes in the fuel cells of the fuel cell stack are used to determine the amount of hydrogen gas injected by the injector.

22 Claims, 4 Drawing Sheets

INJECTOR FLOW MEASUREMENT FOR FUEL CELL APPLICATIONS

BACKGROUND OF THE INVENTION

1. Field of the Invention

This invention relates generally to a method for determining a metered flow of hydrogen fuel to a fuel cell stack and, more particularly, to a method for determining a metered flow of hydrogen fuel through a pulsed injector to a fuel cell stack that uses anode sub-system pressure before the pulsed injection and after the pulsed injection.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

In some fuel cell system designs, one or more injectors are employed to inject hydrogen fuel from a high pressure gas tank into the anode side of the fuel cell stack. The injector has a certain orifice size and will be operated at a certain duty cycle depending on the amount of hydrogen gas needed for the desired stack power. To accurately control or meter the amount of hydrogen fuel being delivered to the stack, the fuel flow can be calculated from the fuel supply pressure and temperature and the injector orifice size and duty cycle.

In order to reduce the cost and weight of fuel cell systems, especially for automotive applications, it is desirable to eliminate as many components as possible. Eliminating the pressure and temperature sensors required to determine the fuel flow to the anode side of the fuel cell stack is one way in which this goal can be addressed.

SUMMARY OF THE INVENTION

In accordance with the teachings of the present invention, a method is disclosed for determining the amount of fuel flow from a high pressure gas tank to the anode side of a fuel cell stack through pulsed injector. The anode sub-system pressure is measured just before the injector pulse and just after injector pulse and a difference between the pressures is determined. The difference between the pressures, the volume of the anode sub-system, the ideal gas constant, the anode sub-system temperature, the fuel consumed from the reaction in the fuel cell stack during the injection event and the fuel cross-over through membranes in the fuel cells of the fuel cell stack are used to determine the amount of hydrogen gas injected by the injector.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining the amount of fuel flow to a fuel cell stack using anode sub-system pressures is merely exemplary in nature, and is in no way intended to limit the invention or its applications or uses. For example, the present invention has particular application for a fuel cell system on a vehicle. However, as will be appreciated by those skilled in the art, the method of the invention may have applications for other types of fuel cell systems.

Figure 1:
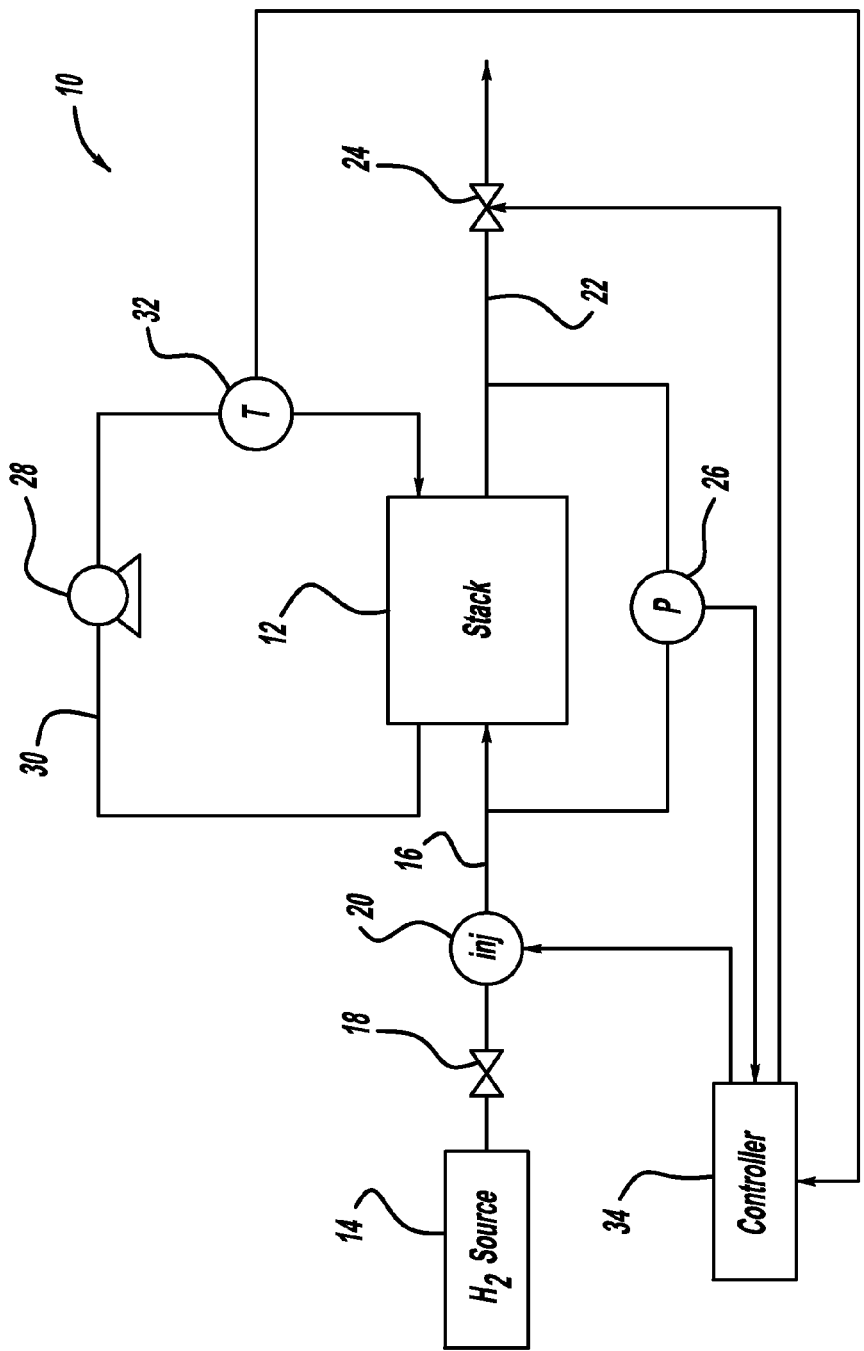
FIG. 1 is a schematic block diagram of a fuel cell system.

FIG. 1 is a schematic block diagram of a fuel cell system 10 including a fuel cell stack 12. Hydrogen gas from a high pressure hydrogen gas source 14, such as a tank, is provided to the anode side of the fuel cell stack 12 on anode input line 16. The hydrogen gas from the source 14 is regulated by a pressure regulator 18 and injected into the stack 12 by an injector 20. The injector 20 is intended to represent a single injector or a bank of injectors suitable for the purposes described herein. Anode exhaust gas from the fuel cell stack 12 is output on anode exhaust line 22. A bleed valve 24 is provided in the anode exhaust gas line 22, and is periodically opened to bleed nitrogen from the anode side of the fuel cell stack 12 in a manner that is well understood to those skilled in the art. In this design, the bleed valve 24 will generally be closed where the stack 12 operates dead-ended. In alternate designs consistent with the discussion herein, the anode exhaust gas may be recirculated back to the anode input line 16 using an anode recirculation loop. The location of the pressure sensor 26 is intended to represent any suitable location for measuring the pressure at the anode inlet, the anode outlet or a recycle line between the anode inlet and outlet.

The system 10 also includes a high temperature pump 28 that pumps a cooling fluid through a coolant loop 30 external to the stack 12 and through cooling fluid flow channels in the stack 12 in a manner that is well understood by those skilled in the art. A temperature sensor 32 measures the temperature of the cooling fluid flowing through the coolant loop 30, and can be provided at any suitable location in the coolant loop 30, such as at an inlet to the stack 12 where the cooling fluid is typically the coolest or at an outlet of the fuel cell stack 12 where the cooling fluid is typically the hottest. A controller 34 receives a pressure signal from the pressure sensor 26 and a temperature signal from the temperature sensor 32, and controls the duty cycle of the injector 20 and the position of the bleed valve 24.

Figure 2:
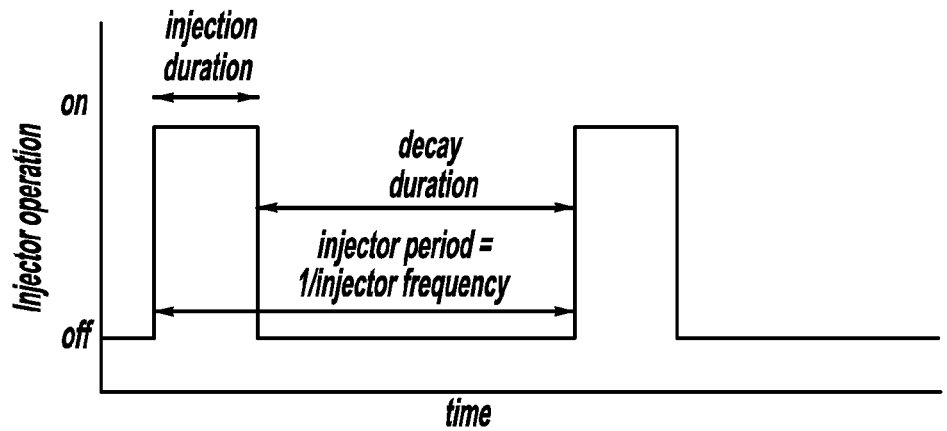
FIG. 2 is a graph with time on the horizontal axis and injector operation on the vertical axis showing an injector cycle for an injector in the system of FIG. 1.

FIG. 2 is a graph with time on the horizontal axis and injector operation between an off-state and an on-state on the vertical axis showing the cycle of the injector 20. Two injector pulses are shown having an injection duration for when the injector 20 is open. The time from when the injector 20 is turned on at one time to when the injector 20 is turned on at a next time is the injector period and equals 1 divided by the injector frequency. The injector duty cycle is the injector duration divided by the injector period. A time from when the injector 20 is shut off to the next time when it is turned on it is known as the injector decay duration.

During each injection event, defined by the injection duration time, the anode sub-system pressure, measured by the pressure sensor 26, is seen to rise as the instantaneous injection rate exceeds the fuel consumption rate by the stack 12. This pressure rise can be used to measure the amount of hydrogen gas injected into the stack 12 for each injection event to determine the fuel flow to the stack 12. If the system 10 is a closed system, when the bleed valve 24 is closed, the amount of hydrogen gas injected $N_{inj}$ into the stack 12 can be defined by:

$$N_{inj}=(P_2-P_1)V/RT+N_{ii}+N_{xoi} \qquad (1)$$

Where $N_{inj}$ is the amount of fuel injected (moles), $P_2$ is the anode sub-system pressure after the injection event (kPa), $P_1$ is the anode sub-system pressure before the injection event (kPa), V is the anode sub-system volume (L), R is the ideal gas constant (8.315 kPa-L/mol-K), T is the anode sub-system temperature (K), $N_{ii}$ is the fuel consumed due to reaction in the stack during the injection event (moles), and $N_{xoi}$ is the gas or fuel cross-over during the injection event (moles).

The amount of fuel injected $N_{inj}$ is the amount of fuel injected during the injection event in moles. The fuel consumed $N_{ii}$ due to the reaction in the fuel cell stack 12 during the injection event is the amount of fuel used by the stack 12 and could be determined by a measured current density of the stack 12. The fuel cross-over $N_{xoi}$ during the injection event is the amount of hydrogen gas that permeates through the membrane in the fuel cells during the injection event and is based on membrane permeability and is a function of many parameters, such as membrane material, anode pressure, cathode pressure, temperature, etc. The volume V of the anode sub-system is known from the stack design. The anode sub-system temperature T can be provided by the stack coolant temperature using the sensor 32. Under low power operation, the fuel injection estimated by this method will have improved accuracy as the consumed and cross-over fuel are relatively small during the short injection period. The accuracy in the measurement is further improved by operating at a lower injector frequency as the pressure rise for an injection event is increased.

Figure 3:
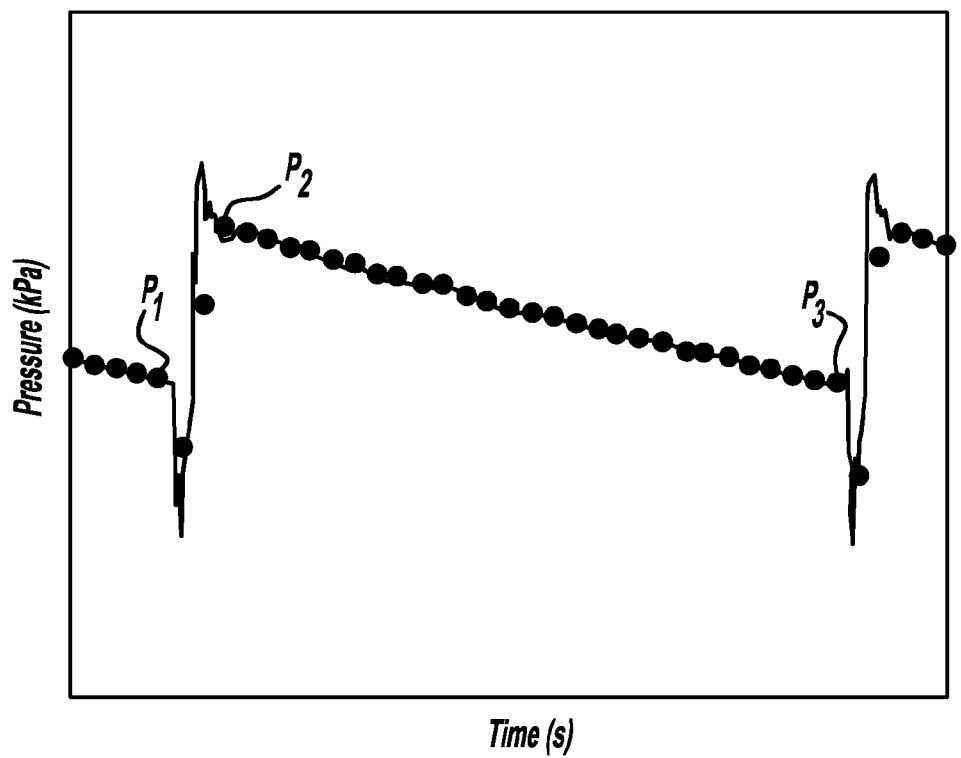
FIG. 3 is a graph with time on the horizontal axis and pressure on the vertical axis showing the pressure in the anode sub-system in response to injector pulses.

FIG. 3 is a graph with time on the horizontal axis and pressure on the vertical axis showing the anode sub-system pressure P during and between injection events. An injection event is identified by a sharp drop in the anode sub-system pressure when the injector 20 is open and then a sharp rise in the anode sub-system pressure when the injector 20 is closed. The pressure $P_1$ is provided just before the injector 20 is opened and the pressure $P_2$ is provided just after the injector 20 is closed. The pressure rise for each pulse is used to estimate the injected fuel. The pressure $P_3$ is typically the same as the pressure $P_1$ and is the anode sub-system pressure at the next injection event. The pressure characteristics being discussed herein are specific to a system with a jet pump driven recycle with a pressure transducer and the recycle loop. The initial pressure drop is due to the suction of the jet pump and the final rise due to the stopping of suction from the jet pump. However, the present invention also includes a pressure change over the entire injection/jet pump driven recycle of that. The injection event timing will be known as the controller drives the injection operation.

The pressure decay between when the injector 20 is closed at pressure $P_2$ until the next time the injector 20 is opened at pressure $P_3$ can be used to determine if there are leaks in the anode sub-system. Particularly, equation (2) below can be used to determine leaks.

$$N_{leak}=(P_2-P_3)V/RT-N_{io}-N_{xoo} \qquad (2)$$

Where $N_{leak}$ is the amount of hydrogen gas leaking between injection events (moles), $P_3$ is the anode sub-system pressure after the decay duration (kPa), $N_{io}$ is the fuel consumed due to reaction in the stack during the decay duration (moles) and $N_{xoo}$ is the fuel cross-over during the decay duration (moles).

Under low power operation, the leak estimate will have improved accuracy as the fuel consumption rate is gradually reduced, typically 20-100 times lower than full power, while the leak rate is only slightly reduced, typically 4-8 times lower because the differential pressures that drive leaks are typically reduced at low pressure. The accuracy in this measurement is further improved with longer decay durations as the pressure change is increased. This type of extended decay duration can be done on a very limited basis, such as once per drive cycle, to limit potential durability impact due to anode starvation. The leaked amount can be normalized by the decay duration to obtain an average leak rate. The decay duration can be used for normalization as the leak will assumed to be occurring at the same rate during the injection duration.

The anode is normally pressure controlled rather than flow controlled so that removal of the supply line pressure and temperature would not affect normal control. However, the startup pressurization and header purge are done under flow control mode. The pressure response of the pressurization step can be used to estimate the average injector flow rate, and this injector operation can be continued for the header purge.

Not all systems use a pressurization step and have a purge, but the pressure response at start up or any point in the operation of the system can be used to estimate the average injector flow rate to allow feed-forward control of the injector 20.

Supply line pressure has also been used to verify tank valve closure, but the pressure in a gas handling unit can also be used. During off-time hydrogen addition, the supply line pressure could be used to verify hydrogen availability. Without this pressure, the hydrogen availability could be determined after an anode fill attempt, if the anode fill increases pressure, then the supply line had pressure before the fill event. If the fill event is not accomplished, then the hydrogen supply valve would need to be opened to provide for an anode fill. Alternatively, the process could rely on a gas handling unit pressure instead of the supply line pressure to determine whether the tank valve needs to be opened to support an off-time hydrogen addition.

The injector flow is controlled by the injector duty cycle and the injector frequency. Injector flow is primarily controlled by the duty cycle, but at very low duty cycles, the injection duration would be too short for repeatable injector opening at higher injector frequencies. Thus, the injector frequency is decreased at low power (low duty cycle) so that each injection event can be of reasonable duration. For an injector/ejector driven recycle system, a minimum injection duration is also desired so that the full differential pressure can be developed to facilitate water movement within and from the anode flow channels of the stack 12.

Figure 4:
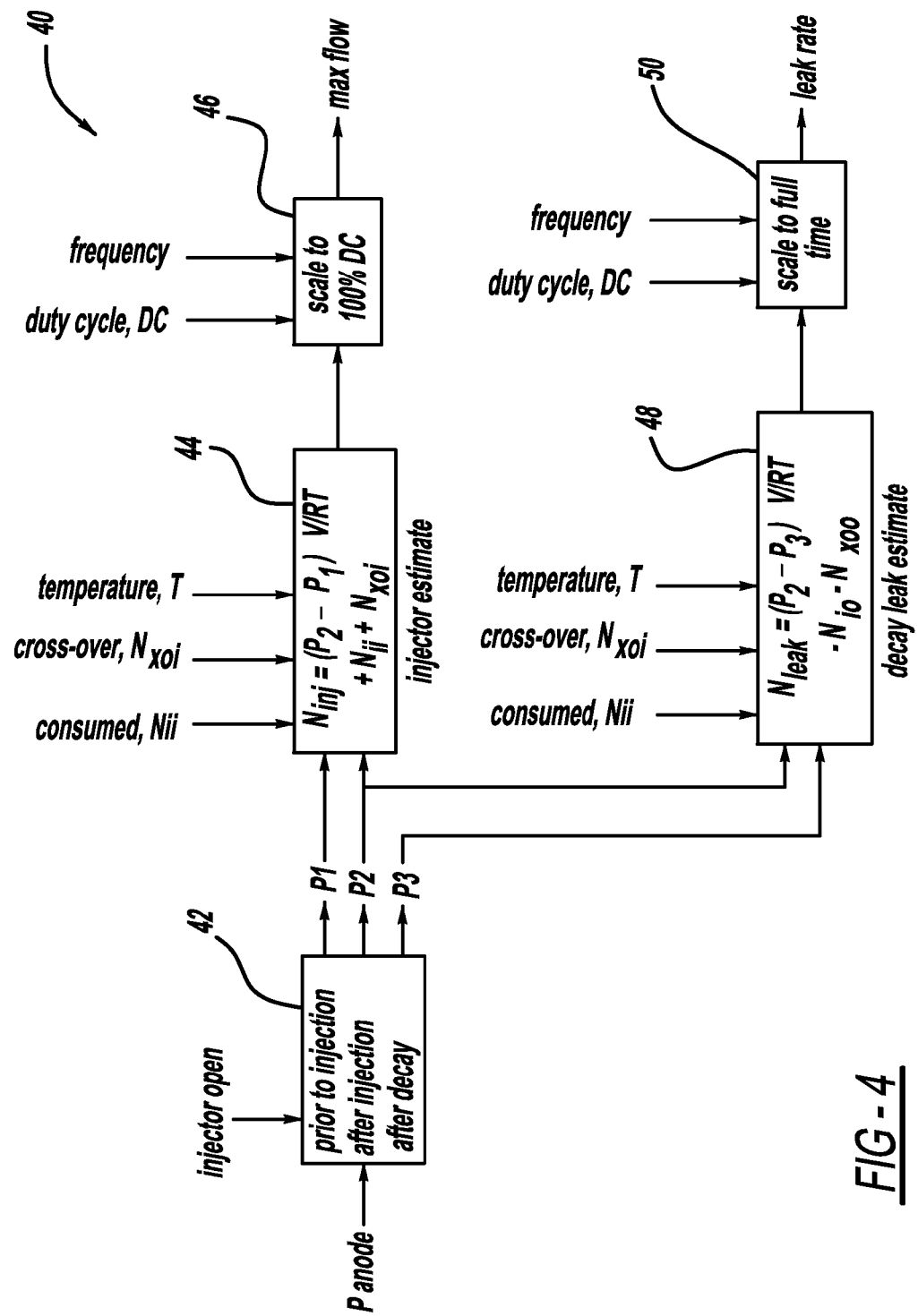
FIG. 4 is a flow block diagram showing a proposed algorithm for using anode sub-system pressures to determine anode flow and leak detection.

FIG. 4 is a flow block diagram for a system 40 that shows a method to estimate the maximum injector flow, as discussed above. The maximum injector flow is determined from the anode sub-system pressure response of previous injection events. Due to the pulsed nature of the flow, the anode sub-system pressure signal must be filtered to extract the pressure at the desired time in the injection cycle. Ideally, a signal of the injector opening can be used as the logic filter for the pressure signal. Preferably, the injector open signal is available as this can be used to determine the time within the injection cycle. Otherwise, the pressure trace can be used to infer when injection events occurred.

Box 42 receives the pressure signal from the pressure sensor 26 and a signal indicating that the injector 20 is open, and outputs the pressures $P_1$, $P_2$ and $P_3$. An injection estimate processor box 44 receives the pressures $P_1$ and $P_2$ from the box 42 and the fuel consumed due to reaction during the injection event $N_{ii}$, the fuel cross-over during the injection event $N_{xoi}$ and the temperature signal from the temperature sensor 32. The processor box 44 uses equation (1) to calculate the amount of fuel injected $N_{inj}$. The injection estimate $N_{inj}$ is used to determine the amount of hydrogen injected during an injection event. The injection estimation $N_{inj}$ is then scaled to 100% DC at box 46, which receives the injector duty cycle and frequency, to the maximum flow based on the duty cycle of the injector 20.

Figure 5:
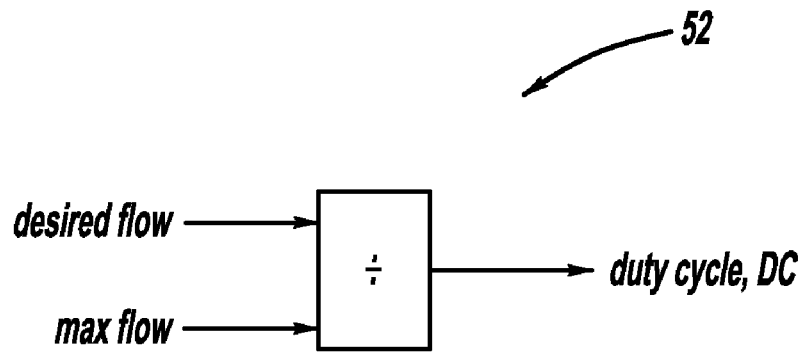
FIG. 5 is a flow block diagram showing an algorithm that sets the injector duty cycle.

A correction can be used based on injection duration, which is determined from injector frequency and duty cycle, to account for injector opening and closing times. It is understood that the injector estimate should only be done when the anode bleed valve 24 is closed. However, in alternate embodiments, it may be possible to estimate the bleed flow and correct the anode flow based on the estimates. The value obtained from the maximum injector flow includes the effects from fuel supply pressure and temperature, as well as the injector flow coefficient, and can be used for several injection cycles as the supply conditions will not change very rapidly as the upstream volume is relatively large compared to the injection volume. The maximum injector flow can be averaged and/or filtered to obtain a more smoothed control response. For conventional controls, to estimate the maximum injector flow, a model of the injector as a choked orifice can be used, which requires the fuel supply pressure and temperature. For both methods, the desired injector flow divided by the maximum injector is used to set the injector duty cycle, which controls the hydrogen flow. FIG. 5 is a block diagram of a system 52 showing one process for determining the injector duty cycle that includes dividing the desired flow through the injector 20 by the maximum flow.

As discussed above, the anode pressure traces between injection events can be used to estimate anode sub-system leakage. A leak estimator processor box 48 receives the pressures $P_2$ and $P_3$, the fuel consumed due to the reaction during the decay duration $N_{io}$ and the fuel cross-over during the decay duration $N_{xoo}$, and calculates a leak estimate $N_{leak}$ using equation (2). The value $N_{leak}$ is then scaled to full time at box 50, which also receives the injector duty cycle and frequency to determine leak rate. The leak estimate from equation (2) uses the pressure decay between the pressures $P_2$ and $P_3$ between injection events to determine the hydrogen loss in the anode sub-system. A portion of this hydrogen gas is consumed as determined by the measured current density and some is expected to cross-over the membrane. The difference is considered to be a leak during the time of the pressure decay. The leak signal can be scaled to a leak rate by this time period, i.e., the time between the pressure decay pressure measurements $P_2$ and $P_3$, which can be approximated as the decay duration based on injector frequency and duty cycle.

For conventional controls, an estimate of the leakage takes the difference between the metered input and consumed hydrogen gas as determined by the measured current density and the expected cross-over. This leak detection method can also be used with the proposed method of fuel metering without the fuel supply pressure and temperature. The leak estimate can be integrated over several injection cycles to improve the accuracy.

It is understood that the leak estimates should only be performed when the anode bleed valve 24 is closed. If the leak rate exceeds a threshold value, the system could set a diagnostic to request service. A likely source of an excess leak is a stuck open bleed valve, so corrective action may also include increased exhaust dilution.

Figure 6:
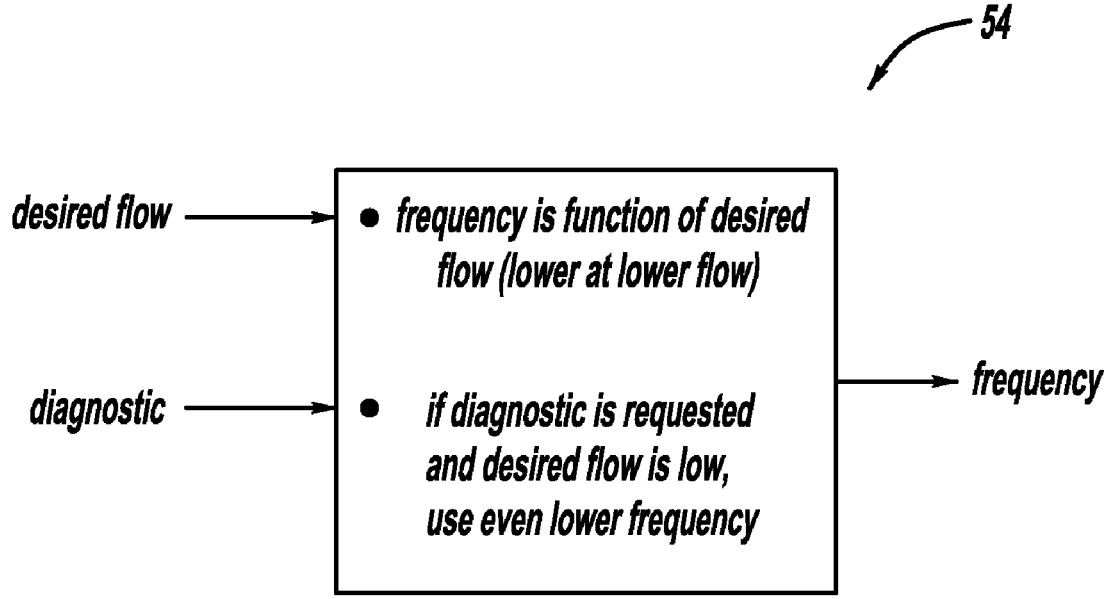
FIG. 6 is a flow block diagram showing an algorithm for reducing injector frequency for leak diagnostics.

To improve the accuracy of the pressure decay based leak estimate, the decay duration can be increased by using a lower injection frequency and the decay duration is also longer at lower duty cycles. Longer decay durations can be used periodically to provide a more accurate leak estimate when requested for diagnostic purposes. FIG. 6 is a block diagram of a system 54 to illustrate this. A very long decay is not routinely desired due to the higher pressure cycling and potential for anode starvation with longer times between injection events, which could impact membrane durability. For this reason, the longer decay durations would preferably be infrequently used only as needed for leakage diagnostics.

Corrections for nitrogen cross-over can be used in the injector and leak estimates. A correction for leakage can be used in the injector estimate. This leakage estimate could also be used to increase the desired flow request to compensate for the leakage.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a fuel flow through a pulsed device that provides hydrogen fuel from a hydrogen source to an anode side of a fuel cell stack, said method comprising:
determining when the device is opened and closed
determining a pressure of the anode side of the fuel cell stack just before opening the device;
determining a pressure of the anode side of the fuel cell stack just after closing the device; and
determining the fuel flow using the difference between the pressure just after closing the device and the pressure just before opening the device.

2. The method according to claim 1 wherein determining the pressure of the anode side includes using a pressure sensor.

3. The method according to claim 1 wherein the method determines a fuel flow through the pulsed device only when an anode bleed valve is closed.

4. The method according to claim 1 wherein the pulsed device is an injector.

5. The method according to claim 4 wherein determining the injector event includes determining a frequency and duty cycle of the injector.

6. The method according to claim 1 further comprising determining whether there is a leak in the anode sub-system during a decay duration by using the difference between the pressure just after closing the device and the pressure just before opening the device.

7. The method according to claim 6 wherein determining whether there is a leak includes using the equation:

$$N_{leak}=(P_2-P_3)V/RT-N_{io}-N_{xoo}$$

where $N_{leak}$ is the amount of leaking between device events, $P_3$ is the anode sub-system pressure after the decay duration, $N_{io}$ is the fuel consumed by the stack during the decay duration and $N_{xoo}$ is the fuel cross-over during the decay duration.

8. The method according to claim 1 wherein determining the fuel flow also includes using a volume of an anode sub-system and a temperature of the anode sub-system.

9. The method according to claim 8 wherein determining the fuel flow also includes using an ideal gas constant, the fuel consumed by the stack during the device event and fuel cross-over through membranes in fuel cells of the fuel cell stack during the device event.

10. The method according to claim 9 wherein determining the fuel flow includes using the equation:

$$N_{inj}=(P_2-P_1)V/RT+N_{ii}+N_{xoi}$$

where $N_{inj}$ is the amount of fuel flow, $P_2$ is the anode sub-system pressure after the device event, $P_1$ is the anode sub-system pressure before the device event, V is the anode sub-system volume, R is the ideal gas constant, T is the anode sub-system temperature, $N_{ii}$ is the fuel consumed by the stack during the device event, and $N_{xoi}$ is the fuel cross-over during the device event.

11. The method according to claim 9 wherein the fuel consumed by the stack during the device event is calculated from measured stack current.

12. The method according to claim 9 wherein the fuel cross-over during the device event is calculated based on membrane permeability.

13. A method for determining a fuel flow through a pulsed injector that injects hydrogen fuel from a hydrogen source to an anode side of a fuel cell stack, said method comprising:
determining injector events of when the injector is opened and closed using a frequency and duty cycle of the injector;
determining a pressure of the anode side of the fuel cell stack just before the injector is opened using a pressure sensor;
determining a pressure of the anode side of the fuel cell stack just after the injector is closed using the pressure sensor; and
determining the amount of fuel flow using the difference between the pressure just after the injector is closed and the pressure just before the injector is opened, a volume of an anode sub-system, a temperature of the anode sub-system and an ideal gas constant.

14. The method according to claim 13 wherein determining the fuel flow also includes using the fuel consumed by the stack during the injector events and fuel cross-over through membranes in fuel cells of the fuel cell stack during the injector events.

15. The method according to claim 14 wherein determining the fuel flow includes using the equation:

$$N_{inj}=(P_2-P_1)V/RT+N_{ii}+N_{xoi}$$

where $N_{inj}$ is the amount of fuel flow, $P_2$ is the anode sub-system pressure after the injector event, $P_1$ is the anode sub-system pressure before the injector event, V is the anode sub-system volume, R is the ideal gas constant, T is the anode sub-system temperature, $N_{ii}$ is the fuel consumed by the stack during the injector event, and $N_{xoi}$ is the fuel cross-over during the injector event.

16. The method according to claim 14 wherein the fuel consumed by the stack during the injectors event is calculated from measured stack current.

17. The method according to claim 14 wherein the fuel cross-over during the injector events is calculated based on membrane permeability.

18. The method according to claim 13 further comprising determining whether there is a leak in the anode sub-system during a decay duration between the injector events using the difference between the pressure just after closing the injector and the pressure just before opening the injector.

19. The method according to claim 18 wherein determining whether there is a leak includes using the equation:

$$N_{leak}=(P_2-P_3)V/RT-N_{io}-N_{xoo}$$

where $N_{leak}$ is the amount of leaking between injector events, $P_3$ is the anode sub-system pressure after the decay duration, $N_{io}$ is the fuel consumed by the stack during the decay duration and $N_{xoo}$ is the fuel cross-over during the decay duration.

20. A system for determining a fuel flow through an injector that provides hydrogen fuel from a hydrogen source to an anode side of a fuel cell stack, said system comprising:
means for determining injector events of when the injector is opened and closed;
means for determining a pressure of the anode side of the fuel cell stack just before opening the injector;
means for determining a pressure of the anode side of the fuel cell stack just after closing the injector; and
means for determining the fuel flow using the difference between the pressure just after closing the injector and the pressure just before opening the injector.

21. The system according to claim 20 wherein the means for determining the fuel flow uses the equation:

$$N_{inj}=(P_2-P_1)V/RT+N_{ii}+N_{xoi}$$

where $N_{inj}$ is the amount of fuel flow, $P_2$ is an anode sub-system pressure after the injector event, $P_1$ is the anode sub-system pressure before the injector event, V is the anode sub-system volume, R is the ideal gas constant, T is the anode sub-system temperature, $N_{ii}$ is the fuel consumed by the stack during the injector event, and $N_{xoi}$ is the fuel cross-over through fuel cell membranes during the injector event.

22. The system according to claim 20 further comprising means for determining whether there is a leak in an anode sub-system that uses the equation:

$$N_{leak}=(P_2-P_3)V/RT-N_{io}-N_{xoo}$$

where $N_{leak}$ is the amount of leaking between injector events, $P_3$ is the anode sub-system pressure after a decay duration between injector events, $N_{io}$ is the fuel consumed by the stack during the decay duration and $N_{xoo}$ is the fuel cross-over through fuel cell membranes during the decay duration.

* * * * *